United States Patent
Watzke

(10) Patent No.: US 8,359,706 B2
(45) Date of Patent: Jan. 29, 2013

(54) VACUUM AND BLOWER ATTACHMENTS

(76) Inventor: David J. Watzke, Placentia, CA (US)

( * ) Notice: Subject to any disclaimer, the term of this patent is extended or adjusted under 35 U.S.C. 154(b) by 1093 days.

(21) Appl. No.: 12/229,457

(22) Filed: Aug. 22, 2008

(65) Prior Publication Data

US 2010/0043169 A1    Feb. 25, 2010

(51) Int. Cl.
*A47L 5/10*   (2006.01)
*A47L 5/26*   (2006.01)

(52) U.S. Cl. .............. 15/345; 15/323; 15/382; 15/387; 15/393; 15/405

(58) Field of Classification Search ............ 15/323, 15/345, 405, 382, 387, 393; *A47L 5/10, 5/26*
See application file for complete search history.

(56) References Cited

U.S. PATENT DOCUMENTS

| | | | | |
|---|---|---|---|---|
| 2,078,634 A * | 4/1937 | Karlstrom | ............ | 15/385 |
| 3,869,265 A * | 3/1975 | Wolter et al. | ......... | 15/327.2 |
| 4,766,638 A | 8/1988 | McDowell | | |
| 5,513,418 A | 5/1996 | Weber | | |
| 6,237,189 B1 | 5/2001 | Maurer et al. | | |
| D443,741 S | 6/2001 | Parr et al. | | |
| 6,269,519 B1 * | 8/2001 | Harvey et al. | ......... | 15/387 |
| 6,513,190 B1 | 2/2003 | Allgeier et al. | | |
| 6,581,240 B2 | 6/2003 | Kaffenberger | | |
| 6,792,649 B2 | 9/2004 | Paterson et al. | | |
| D513,351 S | 12/2005 | Archer | | |
| 7,251,857 B2 * | 8/2007 | Caruso | ............ | 15/377 |
| 8,042,223 B2 * | 10/2011 | Freewalt | ......... | 15/405 |
| 2007/0180646 A1 * | 8/2007 | Valentine | ......... | 15/323 |

OTHER PUBLICATIONS

Hammacher Schlemmer Catalog, The "Keep Your Distance" Bug Vacuum (product information), p. 41. Date: Unknown (prior to Aug. 22, 2008).
http://go-duster.com/, "Go Duster" (product information), Accessed on Jun. 30, 2007.
http://www.bedbathandbeyond.com/Product.asp?order_num=79042902&WRN=-11534264..., High Reach Ceiling Kit (product information), Accessed on Aug. 1, 2007.

* cited by examiner

*Primary Examiner* — David Redding
(74) *Attorney, Agent, or Firm* — Stout, Uxa, Buyan & Mullins; Carlos A. Fisher

(57) ABSTRACT

The invention is drawn to methods and apparatus comprising the use of attachment components comprising fluid-driven turbines to dusting, trimming, polishing, and claiming a locus, such as a surface.

19 Claims, 4 Drawing Sheets

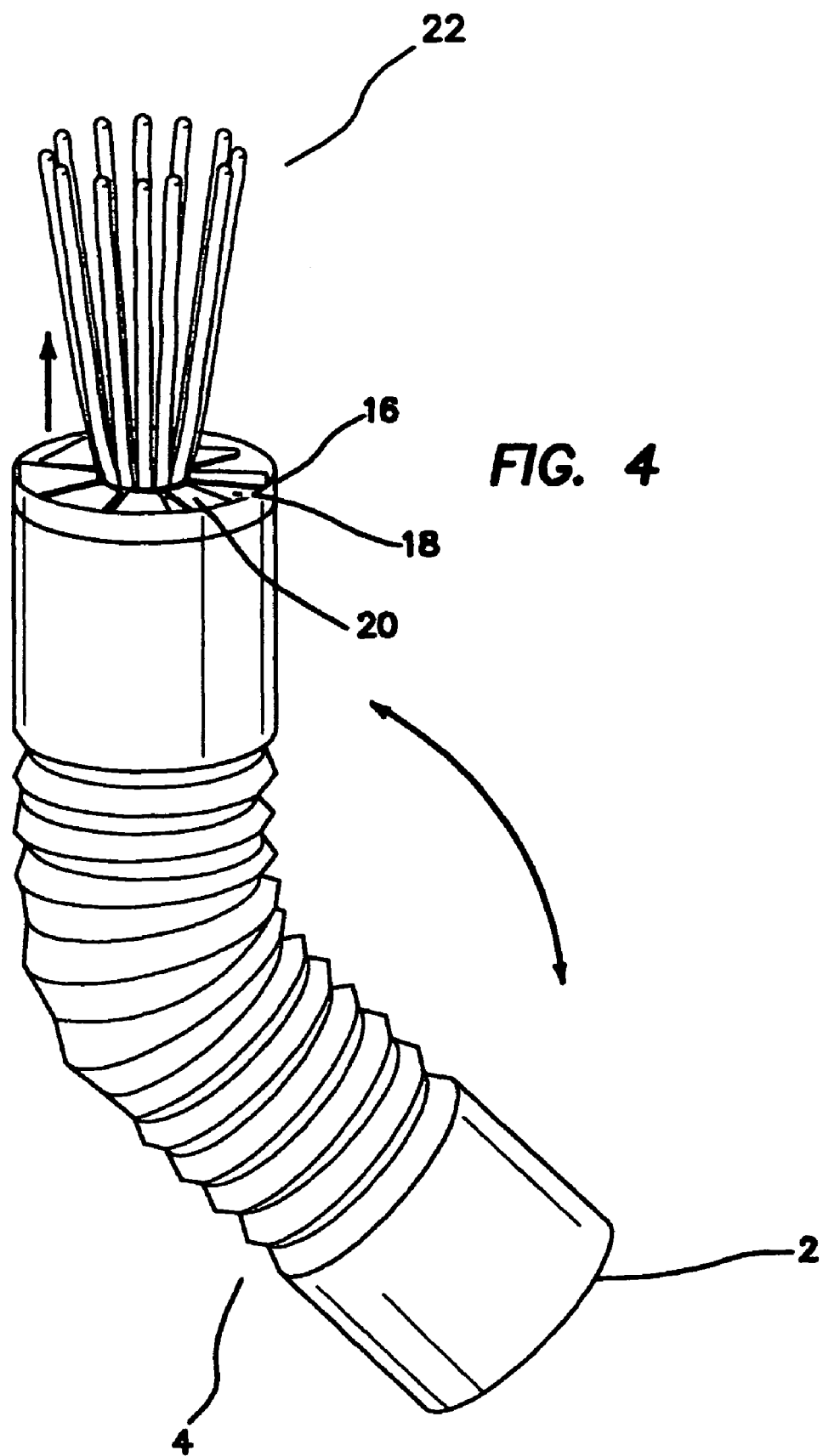

VACUUM AND BLOWER ATTACHMENTS

FIELD OF THE INVENTION

This invention is related to turbine-driven attachments to vacuums and blowers, and methods for their use.

BACKGROUND OF THE INVENTION

Vacuum cleaners, and to a lesser degree blowers, are commonly used for household, workplace, and garden cleaning, removal of dirt, dust, soil and foliage such as leaves and twigs from surfaces, and the like.

Vacuum cleaners comprise a fluid pressure source having blades that upon rotation cause the generation of a negative air pressure at an air intake end of the turbine component, and a positive air pressure at an air exhaust end of the turbine. The turbine is generally powered by an electric motor. A hose is generally connected to the air intake end of the turbine and a filter (such as a bag) is placed in the suction line to collect particulate material in the air flow picked up by suction from the surface or location to be cleaned. Often the distal end of the hose is fitted with an attachment for cleaning crevices, upholstery, drapery and the like.

Similarly, a powered turbine may be used not only as a vacuum but as a blower; this involves directing the air outlet or exhaust into a hose or tube thereby increasing its velocity and ability to be directed to a particular direction. Blowers are commonly used outdoors, for example in gardening applications to blow debris such as snow, leaves, twigs and cut grass into the street or away from gardens, walkways, driveways and yards. Often these blowers are portable, and may be battery or gasoline powered.

Additionally, so called "weed whackers" employ a spooled plastic blade or nylon string, which is rotated using an electric, gasoline, or battery-powered motor to shear weeds or other foliage. These devices are also used in gardening and landscaping applications.

Certain fluid pressure sources may be common garden hoses which can be used to turn a turbine having turbine blades and water outlets. Furthermore, external fluid pumps can be used for the same purpose i.e., to provide negative or positive fluid pressure to the turbine within the attachment component.

SUMMARY OF THE INVENTION

The present invention is directed to methods and apparatus involving the use of an air or vacuum-driven turbines to power rotating tools. These turbines may be structured as attachments to fit at the distal end of conduits, hoses or tubes that direct air to or from a central, larger turbine. For example, in certain embodiments these attachments are structured to be affixed to home or shop vacuum cleaners. In other embodiments the source of fluid pressure may be, without limitation, a garden hose of water pump.

The attachments of the present invention that are associated with vacuum cleaners are particularly advantageous, since the turbines of the attachments may be used to rotate dusting tails, dusting wings, filaments or cords and thus loosen and suspend dust, dirt, spider webs and the like, with the vacuum then sucking the suspended material into the apparatus and trapping it in the vacuum's filter. Rigid or inflatable attachment extensions may be used to extend the reach of such extensions.

In one particularly advantageous application, the attachments of the present invention may be used to clean, dust, and vacuum a locus, for example ceiling and awning areas, which are often ignored during normal vacuuming or outside home maintenance. Turbine-rotated filaments can be directed at the corners of the ceiling or the junction between ceiling and wall, where spider webs are likely to occur. Since the distal end of the attachment retains the vacuum air inlet, the spider webs are then immediately sucked into and disposed of within the vacuum without falling from the ceiling onto people or the surfaces at or closer to ground level.

Alternatively, and particularly if it is less important to entirely remove the dust or traces of a spider web from the location, the same or a similar attachment may be used in conjunction with a blower, such as the air outlet of a shop or home vacuum. The same attachment turbine can be configured to function in a vacuum mode, wherein the turbine is powered by the inflow of air rather than the outflow of air.

In other embodiments, the present invention may be configured for use as a weed whacker device, wherein the blades of the weed whacker are rotated using an air or water turbine.

The present invention envisions various different rotating turbine-driven attachments. These may include a spinning duster tip which may be made using synthetic or natural materials including microfibers, foam, synthetic fleece or pile, feathers, fur, such as rabbit tail, and the like. The brush or duster elements may not be movable when subjected to centrifugal force; alternatively, when the distal portion of the attachment spins the brush or duster elements may be extended, for example, in a manner similar to that of a weed whacker or battery powered folding portable fan, due to centrifugal force. In other embodiments the attachment elements may comprise filaments, strings, and the like, which may function to, for example, trim foliage in a manner similar to a weed whacker. Collectively these attachment elements shall be referred to as rotational elements.

The speed with which the turbine rotates can be controlled by the velocity of the air stream and the pitch of the turbine blades relative to the direction of air flow. Thus, when the turbine blade is positioned parallel to the direction of air flow, essentially no lateral or rotational force is applied. As the blade angle is turned towards the perpendicular, the air exerts a force on the blade causing the turbine to turn. By adjusting the blade angle the amount of force applied to the turbine and the velocity of the turbine can be optimized.

The present invention also comprises methods employing the attachments of the present invention for cleaning, dusting, and removing debris from a desired location or surface comprising connecting such attachments to a source of air or suction, and employing the attachment to clean, dust or remove debris from such surface or location.

Either the attachment itself, or the distal parts of an extension hose or tube may be bendable, for example, from a straight section of hosing to a 90 degree angle to permit the attachment to reach features of, for example, a wall, chandelier, bookcase, ceiling, and the like. This may be accomplished using a simple extension molded to be the desired angle, or may be made to be bendable at various desired angles.

The examples that follow are intended to illustrate certain embodiments of the invention. However these examples do not limit the scope of the invention, which is defined by the claims that conclude this specification.

BRIEF DESCRIPTION OF THE DRAWINGS

FIG. 4 is a view of a further attachment for a blower, or preferably a vacuum, comprising a turbine on a bearing centered rotation in a box housing, the turbine comprising a dusting tail. The attachment can preferably be adjusted to be oriented at angles of from about 180° to about 90° in relation to the hose or extension thereof, and located at the distal end of the hose or extension.

DETAILED DESCRIPTION OF SELECTED EMBODIMENTS

The present invention is related to blower and vacuum attachments comprising an air turbine and one or more duster components attached to a rotatable distal portion of the attachment, as well as to methods of making and using such attachments.

The following embodiments are intended to illustrate different aspects, embodiments, and variants of the invention. However, it will be understood that the invention is in no way to be limited to the aspects, embodiments, and variants so illustrated, and is instead to be construed solely in accordance with the claims that conclude this specification.

Figure 1:
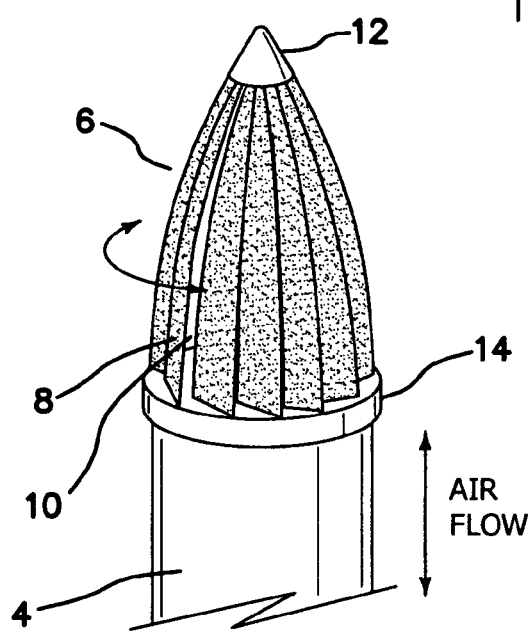
FIG. 1 is a view of an attachment of the present invention comprising a spinning dust tip, and tapered elongated turbine blades. The blades are coated with a rotational element comprising a soft, felt-like material.

FIG. 1 of this specification shows an embodiment of the attachments of the present invention. In this embodiment a vacuum or extension (not shown) is connected to the attachment. Generally the hose or extension has a smaller external diameter than that of the proximal portion of the attachment. However, in other embodiments the hose or extension may have a larger external diameter than that of the proximal portion of the attachment. The neck (4) of the attachment may be straight, or may be bent or curved (as shown) to permit the attachment to laterally contact the surface to be cleaned. In certain embodiments, the neck of the attachment (or of an extension segment) may be adjustable from a straight configuration to an approximately 90° angle.

The distal end of the attachment comprises a rotatable turbine component (6) comprising a series of elongated turbine blades (8) which are beveled to have a pitch sufficient to impose a torque force in a single direction, thereby causing the rotatable turbine component to spin in reaction to the flow of air through the slits (10) between the turbine blades.

The blades have a soft, dust-removing surface which may be any suitable non-abrasive material including, for example, felt, sponge-type materials, cotton, feathers, porous polymeric materials, and the like. The rotatable turbine component of this embodiment of the invention is tapered to be narrower at the distal end than the proximal end to permit the attachment to be effective in corners, wall-ceiling junctions, and other tight spots. Additionally, the extreme distal end of the attachment may comprise a soft tip, such as the pointed soft tip (12) shown in FIG. 1.

In the embodiment of the invention shown in FIG. 1, the rotatable turbine component comprises the blades described above, attached at their proximal end to a base component (14). The base component is typically, although not exclusively, made using bearings to reduce friction. The base component may be made wholly or partially of metal or a plastic, preferably a durable hard plastic component.

Although the attachment shown in FIG. 1 may be powered using either suction or a blower, in a preferred embodiment, the attachment is powered using suction, such as suction powered by a vacuum cleaner or other vacuum source. An advantage of using a vacuum source is that the dust, cobwebs, and other debris loosened by the spinning turbines are immediately drawn into the vacuum stream and removed from the proximity of the surface to be cleaned.

Figure 2A:
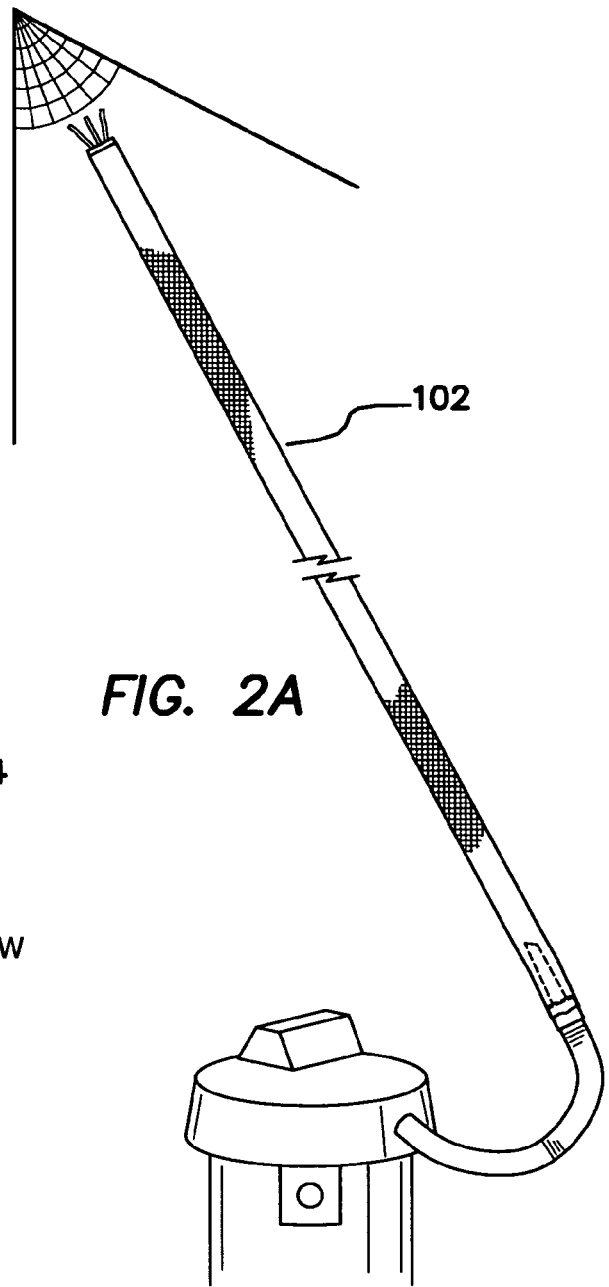
FIG. 2A is a view of another embodiment of the present invention, in which the attachment is attached to the blower (air outlet) of a vacuum, such as a shop vac. The drawing also shows a lightweight extension sleeve made from a substantially airtight lightweight material, such as a nylon sock, which will provide a rigid extension when the blower is turned on permitting cleaning of a ceiling. The distal end of the sock is attached to an attachment comprising a brush having "fingers" or feathers affixed to and rotatable with a propeller or turbine.

In FIG. 2A, a lightweight and compact attachment extension component (102) is shown, which operates only when the turbine of the attachment is driven by a blower. The attachment extension component is made from a fabric, polymeric, or fibrous material that can be easily compressed, for example into a bag or sock, when not in use. Preferably, the extension component comprises nylon or a similar fabric, or a polyamid fiber such as KEVLAR®. The fabric may contain elastic or flexible elements to facilitate storage of the extension. The extension should be sufficiently long to permit the attachment to reach a typical ceiling, for example, at least about 8 feet, or about 10 feet, or about 13 feet or more.

The attachment component is fastened to the extension component by any suitable means. For example, the extension may feature a lightweight plastic collar at the distal end, which may be, for example, stitched or riveted to the fabric. The collar may have an external diameter slightly smaller than the internal diameter of the proximal portion of the attachment. Alternatively, the collar may have an internal diameter slightly larger than the external diameter of the proximal portion of the attachment. Although the term "diameter" is used here, it will be apparent that the hose, extension, or conduit may have a cross section other than that of a circle; in such case, the term diameter as used herein will mean the cross sectional dimensions of the hose, extension of the conduit and of the proximal portion of the attachment.

In another embodiment, the attachment is permanently bonded to the extension such that the extension becomes the proximal portion of the attachment. When not in use, the extension may be rolled or contracted into a "sleeve", which can be fastened using any suitable retaining device.

Figures 2B, 2C:
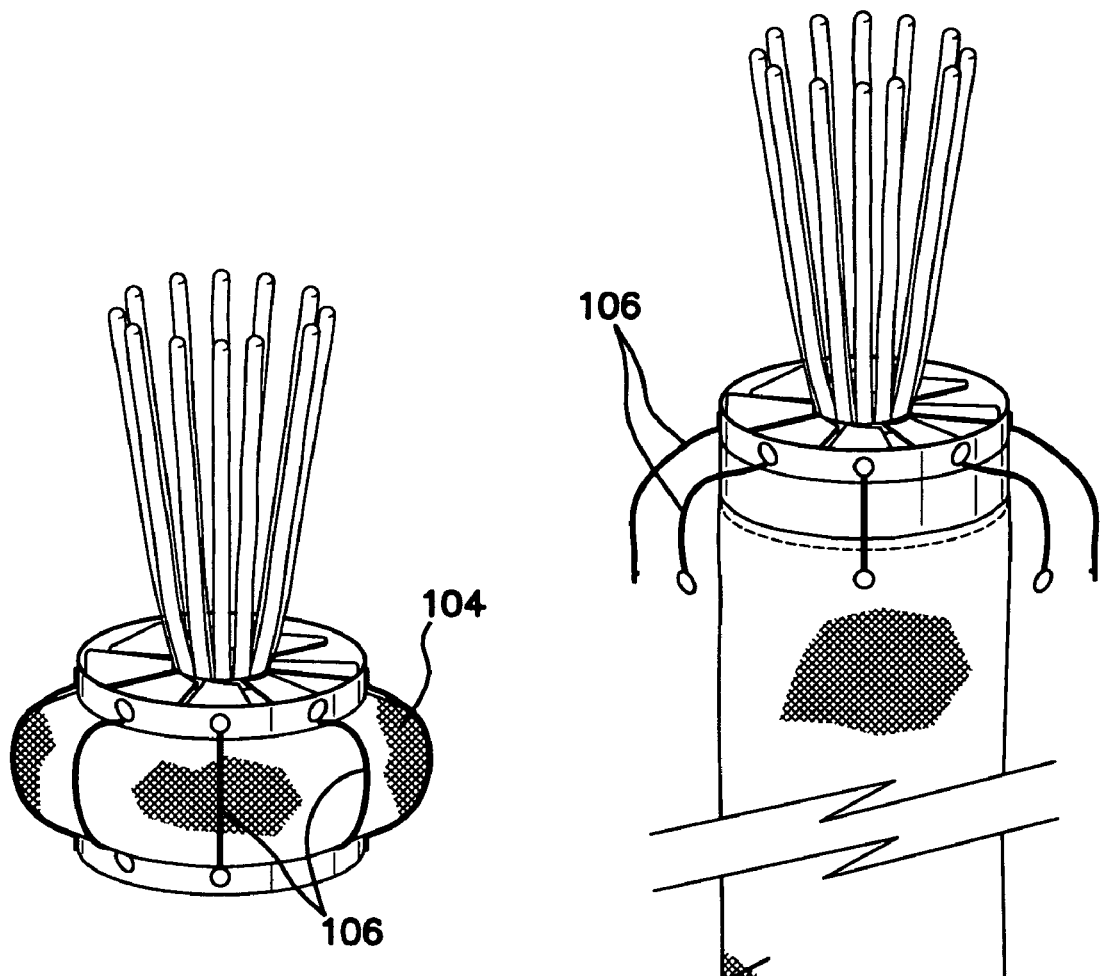
FIG. 2B shows a brush turbine extension for a blower comprising a nylon sock and a series of snap ties maintaining the sock in a folded configuration.
FIG. 2C shows a brush turbine extension for a blower comprising a nylon sock in the inflated state, with the snap ties undone.

FIG. 2B is a close-up view of the sock assembly of FIG. 2 showing the sleeve of this embodiment of the invention (104) in its rolled configuration, with snapped retaining bands (106) maintaining the sleeve in position.

FIG. 2C is a close up view of the sleeve (104) in its extended position, whereby the retaining bands (106) have been released.

It will be understood that snapped retaining bands are only one of many possible ways of retaining the sleeve in place; such ways may include buttons, buckles, a hook and loop VELCRO®-type material, or the like.

Regardless of how the attachment extension component is fastened, when it is in use, the extension is inflated by the blower, and becomes sufficiently rigid to permit the user to reach a ceiling or other difficult-to-reach location with the attachment. The attachment at the distal end of the extension component may comprise any particular attachment type which is suitable for use with a blower.

Figure 3:
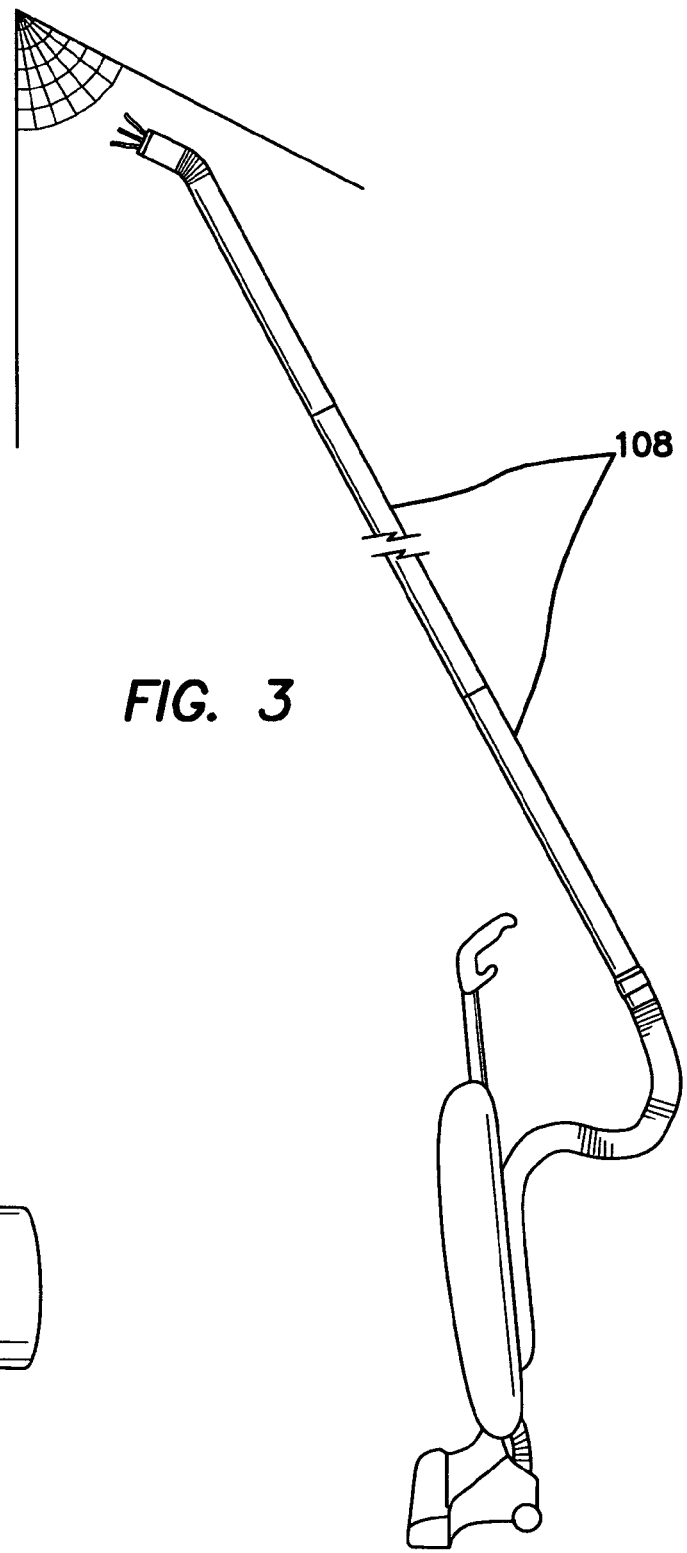
FIG. 3 is a view of another embodiment of the present invention, in which the attachment is attached to the vacuum (air outlet) of a vacuum cleaner, such as a common household vacuum. The distal end of the sock comprises a attachment having turbine blades causing the tip to spin. The drawing also shows the use of the attachment to knock down and dispose of cobwebs and the like using an extension comprising lengths of lightweight rigid plastic tubing.

FIG. 3 is a view of another type of extension. In this case, the extension is made from a rigid, lightweight material, such as a rigid plastic, paper, or wooden tube that connects the attachment, which is located at the distal end of the attachment to the hose, air intake or air outlet of a vacuum pump or blower. While the attachment extension component in this embodiment of the invention may comprise a single long tube or duct member, in the embodiment shown in FIG. 3 the attachment extension component comprises a number of detachable segments (108) that fit together in a stable and substantially air-tight manner. For example, the segments may be about 3 feet in length. When assembled, the number and length of the extension segments is sufficiently long to permit the attachment to reach a ceiling, for example, at least about 8 feet, or about 10 feet, or about 13 feet or more. The separated segments can be stored in a container, such as a nylon bag when not in use.

When the attachment is connected to a vacuum, the turbine component of the attachment is powered by suction, causing the distal part of the attachment to spin. Dust and dirt agitated by the spinning attachment is then sucked into the attachment extension component, and thus into the vacuum bag.

Preferably, although not necessarily invariably, the top extension segment (the extension segment that is connected to the attachment) is curved at a 90 degree angle, or adjustable from essentially straight to about a 90 degree angle to aid in cleaning corners and tight spots.

Also preferably the device powering the turbine-driven attachment and extension is a household vacuum cleaner. However in other embodiments a shop vac or blower may be used as well. In the latter embodiment, of course, the dust and dirt will be blown free rather than sucked into the vacuum and eliminated.

FIG. 4 shows another embodiment of the attachment of the present invention. As in FIG. 1, in this embodiment a vacuum or extension (not shown) is connected to the attachment. Generally the hose or extension has a smaller external diameter than that of the proximal portion of the attachment (2). However, in other embodiments the hose or extension may have a larger external diameter than that of the proximal portion of the attachment. The neck (4) of the attachment may be straight, or may be bent or curved (as shown) to permit the attachment to laterally contact the surface to be cleaned. In certain embodiments, the neck of the attachment (or of an extension segment) may be adjustable from a straight configuration to an approximately 90° angle.

The distal end of the attachment comprises a rotatable turbine component (16). The turbine component comprises a series of flat turbine blades (18) which are substantially flush. The blades are beveled to have a pitch sufficient to impose a torque force in a single direction, thereby causing the rotatable turbine component to spin in reaction to the flow of air through the slits (20) between the turbine blades.

A dusting tail component (22) protrudes from the end of the turbine component and is attached to the turbine component in a manner such that the dusting tail rotates when the turbine is powered. The dusting tail may comprise any suitable soft, dust-removing surface, for example, felt, sponge-type materials, cotton, feathers, porous polymeric materials, and the like. The dusting tail may be tapered to be narrower at the distal end than in the middle to permit the attachment to be effective in corners, wall-ceiling junctions, and other tight spots.

The dusting tail is joined to the rotating turbine component so that it spins when the turbine is powered by a blower or vacuum. In certain embodiments, components of the dusting tail may flex or extend filaments when subjected to rotational force so as to become more "full" or fluffy, and this to have more available surface area to dust or clean the desired surface.

The attachment of the present invention may also be ideal for dusting chandeliers, windows, window frames, cleaning outside eaves, and the like.

In other, alternative embodiments, the attachment tip may comprise one or more (preferably a plurality) of elongated filaments, such as broom filaments or polymeric filaments. Such filaments preferably, or in certain embodiments, invariably, have a high degree of springiness or resilience and a "memory" whereby when the applied force is removed, the filament returns to its original, straight configuration. In this manner, the rotating attachment acts as a disrupter to disrupt caked dust or dirt, or cobwebs. An advantage to such a disrupter attachment is that it can easily be used in narrow, hard to reach locations. When powered by a vacuum, the dislodged dirt, dust and other debris is sucked into the turbine intake slits, and thence into the vacuum for disposal.

The turbine component is typically, although not exclusively, made using bearings to reduce friction. The turbine component may be made wholly or partially of metal or a plastic, preferably a durable hard plastic component.

Figure 5:
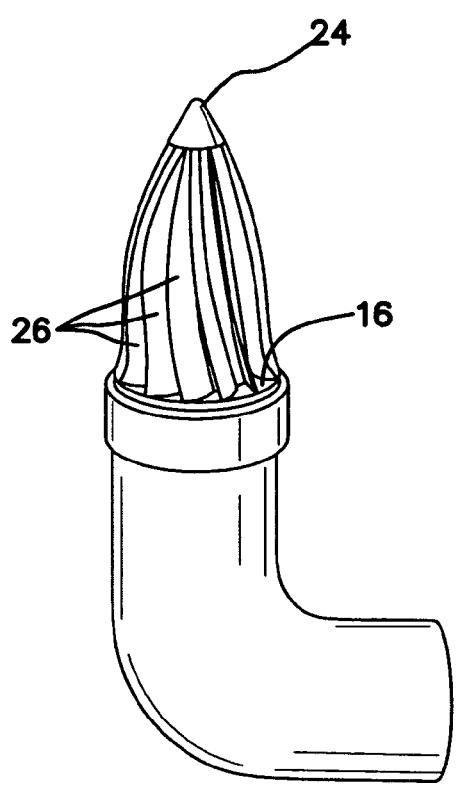
FIG. 5 is a view showing another embodiment or attachment of the present invention comprising a duster attachment affixed to a turbine and wherein the dusting elements, which may extend at approximately right angles to the axis of air flow, may comprise rabbit tail, feathers, broom straws or fibers or filaments.

FIG. 5 shows another embodiment of the attachments of the present invention. In this embodiment, the distal end of the attachment comprises a rotatable turbine component (16), similar to the turbine shown in FIG. 4. The turbine component thus comprises a series of flat turbine blades which are substantially flush. The blades are beveled to have a pitch sufficient to impose a torque force in a single direction, thereby causing the rotatable turbine component to spin in reaction to the flow of air through the slits between the turbine blades.

An axle (not shown) located in the center of the turbine component projects outward towards the distal end of the attachment, and terminates in substantially pointed tip (24) preferably comprising a soft material suitable for dusting the corners or edges of the ceiling and walls. Radially arranged around the tip in a downward configuration are a plurality of dusting wings (26), which may fall loosely, or be retained downward from the tip towards the body of the turbine when the turbine is not in use. Alternatively, the dusting wings may be hinged so that they are free to move around. The dusting wings generally comprise a soft material such as rabbit fur, feathers, foam or polymeric material or fabric. In other embodiments, however, the dusting wings may comprise filaments (such as broom straws, wires, nylon or other polymeric strings or line, laminates, bamboo slats and the like) such as those shown in the embodiment of FIG. 4 extending downward from the tip (24). These filaments, like those described above in relation to FIG. 4, are flexible and tend to fan out when the turbine component is activated and return to their closed or downward configuration when the turbine is stopped.

In an optional variation, the axle protruding from the turbine component may be spring-loaded such that it collapses in the proximal direction when pressed down, but returns to its original position when released.

The turbine may comprise a fan having blades and spaces therebetween similar to a small computer cooling fan, without the need for a motor.

Additional embodiments of the present invention may comprise attachments containing water or fluid-driven turbines for use in the garden or outdoors. For example, the attachments of the present invention may be configured to screw onto the distal end of a water hose. In such embodiments, the attachment may comprise a turbine component essentially as described with reference to FIG. 4 and FIG. 5. Filamentous "blades", polymer strings, or fibers may be attached thereto and the device used to trim foliage, as a water-, vacuum- or blower-powered "weed wacker", to clean eaves, or for other, similar purposes. Of course an eaves cleaner attachment may also be used in the vacuum mode.

Accordingly, the above-mentioned embodiments of the invention set forth the currently contemplated favored embodiments and mode of the invention. However, only the claims that follow this specification define the invention, which shall not be considered limited to the embodiments explicitly exemplified herein. Although the foregoing invention has been described in detail for purposes of clarity of understanding, it will be obvious that certain modifications may be practiced within the scope of the appended claims.

I claim:

1. An apparatus for removing undesired material from a surface comprising:
   a) a fluid-powered, rotatable turbine component comprising a fan having a plurality of turbine blades positioned therewithin, and one or more rotational elements joined to the distal face of the fan, said turbine component being adapted to be operably joined to a source of fluid pressure, and
   b) at least one rotational element joined to a distal end of said turbine component,
   wherein when fluid pressure is applied to the turbine component the rotational element spins, and wherein the one or more rotational elements comprise one or more dusting wings.

2. The apparatus of claim 1, wherein the fluid is a gas.

3. The apparatus of claim 1 wherein the fluid is a liquid.

4. The apparatus of claim 1 wherein the source of fluid pressure is a source of negative pressure.

5. The apparatus of claim 1 wherein the source of fluid pressure is as source of positive pressure.

6. The apparatus of claim 1 wherein the turbine component comprises a plurality of elongated turbine blades having a rotational element on an outward-facing surface thereof.

7. The apparatus of claim 6 wherein a distal tip of said apparatus is substantially pointed and covered with a non-abrasive material.

8. The apparatus of claim 1 wherein the turbine component comprises a fan having a plurality of turbine blades positioned therewithin, an axle terminating at the distal end in a tip being joined to the face of the fan, wherein one or more dusting wing is secured to the distal end of the axle or the tip attached thereto.

9. A system for removing undesired material from a locus comprising:
   i. a source of fluid pressure,
   ii. a fluid-powered, rotatable turbine component having a plurality of turbine blades and adapted to be operably joined to said source of fluid pressure, and
   iii. at least one rotational element joined to a distal end of said turbine component,
   wherein when fluid pressure is applied to the turbine component the rotational element spins, and wherein the one or more rotational element comprises a dusting wing.

10. The system of claim 9 wherein the source of fluid pressure is a vacuum.

11. The system of claim 9 wherein the system comprises an attachment extension component operably joining an attachment component and the source of fluid pressure.

12. The system of claim 11 wherein the source of fluid pressure is a blower, and the attachment extension component is an inflatable sleeve connecting the attachment and the source of fluid pressure, and having a length sufficient to permit the attachment to reach a ceiling.

13. The system of claim 12 comprising retention means for maintaining the inflatable sleeve in a compact configuration when not in use.

14. The system of claim 11 wherein the source of fluid pressure is a vacuum, and the attachment extension comprises one or more rigid tubing segment connecting the attachment and the source of fluid pressure, and having a length sufficient to permit the attachment to reach a ceiling.

15. The system of claim 14 wherein one or more of said rigid tubing segments, or the proximal portion of said attachment, is adjustable to provide an attachment contact angle of approximately 90 degrees.

16. The system of claim 14 wherein the length of each segment is from about 2 feet to about 3 feet.

17. The system of claim 14 wherein said one or more attachment extension totals at least about 6 feet to about 10 feet in length.

18. The system of claim 14 comprising a storage component for storing the attachment extension when it is not in use.

19. The system of claim 14 wherein said storage component comprises a bag.

* * * * *